US009648453B2

(12) United States Patent
Morgner

(10) Patent No.: US 9,648,453 B2
(45) Date of Patent: May 9, 2017

(54) PROVIDING POSITION DATA BY MEANS OF A DISTANCE-BOUNDING PROTOCOL

(71) Applicant: BUNDESDRUCKEREI GMBH, Berlin (DE)

(72) Inventor: Frank Morgner, Grünheide (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 77 days.

(21) Appl. No.: 14/762,273

(22) PCT Filed: Jan. 23, 2014

(86) PCT No.: PCT/EP2014/051297
§ 371 (c)(1),
(2) Date: Jul. 21, 2015

(87) PCT Pub. No.: WO2014/114699
PCT Pub. Date: Jul. 31, 2014

(65) Prior Publication Data
US 2015/0365791 A1 Dec. 17, 2015

(30) Foreign Application Priority Data

Jan. 25, 2013 (DE) .......... 10 2013 201 245
Feb. 4, 2013 (DE) .......... 10 2013 201 730

(51) Int. Cl.
*H04W 24/00* (2009.01)
*H04W 4/02* (2009.01)
(Continued)

(52) U.S. Cl.
CPC .......... *H04W 4/02* (2013.01); *G06Q 20/3224* (2013.01); *G06Q 20/341* (2013.01);
(Continued)

(58) Field of Classification Search
USPC .................. 340/994, 932.2, 5.61; 455/456.3
See application file for complete search history.

(56) References Cited

U.S. PATENT DOCUMENTS 6,650,999 B1 * 11/2003 Brust .................... B60R 25/102
340/932.2
7,604,168 B2 * 10/2009 Eun ........................ G08B 21/24
235/384

(Continued)

FOREIGN PATENT DOCUMENTS

EP    2 051 475    4/2009
EP    2 247 024    11/2010

OTHER PUBLICATIONS

EPO IPR, PCT/EP2014/051297, May 13, 2014.
Hancke et al., :An RFID Distance Bounding Protocol, SECURECOMM 2005, IEEE, Sep. 5, 2005, pp. 67-73.

*Primary Examiner* — David Q Nguyen
(74) *Attorney, Agent, or Firm* — Leveque IP Law, P.C.

(57) ABSTRACT

A method is proposed for providing position data for a chip card having portions for receiving or detecting position data of a localization unit by the localization unit, wherein the localization unit is spatially separate from the chip card; transmitting the position data from the localization unit to the chip card via a contactless interface with use of a cryptographic protocol; executing a distance-bounding protocol between the chip card and the localization unit, wherein the distance-bounding protocol then concludes successfully precisely when the spatial distance between the chip card and localization unit does not exceed a predefined maximum distance; and executing a chip card function with successful conclusion of the distance-bounding protocol, wherein the chip card function uses the transmitted position data as position data specifying the current position of the chip card.

15 Claims, 3 Drawing Sheets

(51) Int. Cl.
  *H04L 9/08* (2006.01)
  *H04L 9/32* (2006.01)
  *H04W 64/00* (2009.01)
  *G06Q 20/32* (2012.01)
  *G06Q 20/34* (2012.01)
  *H04W 12/06* (2009.01)

(52) U.S. Cl.
  CPC .......... *H04L 9/0872* (2013.01); *H04L 9/3271* (2013.01); *H04W 12/06* (2013.01); *H04W 64/00* (2013.01)

(56) References Cited

U.S. PATENT DOCUMENTS

| | | | |
|---|---|---|---|
| 8,280,791 B2* | 10/2012 | Davis, III | G01G 19/4142 340/5.61 |
| 8,340,904 B2* | 12/2012 | Lin | G08G 1/123 340/994 |
| 2004/0112959 A1* | 6/2004 | Jun | G07C 5/008 235/384 |
| 2005/0156759 A1* | 7/2005 | Aota | G08G 1/202 340/994 |
| 2010/0280748 A1 | 11/2010 | Mundinger et al. | |
| 2011/0047037 A1* | 2/2011 | Wu | G06Q 20/204 705/17 |
| 2011/0078549 A1 | 3/2011 | Thueringer et al. | |

\* cited by examiner

PROVIDING POSITION DATA BY MEANS OF A DISTANCE-BOUNDING PROTOCOL

BACKGROUND

The disclosure relates to a method for securely providing position data from a localisation unit to a chip card and also to a corresponding chip card, a corresponding localisation unit, and a computer program product.

Methods for reliably determining the spatial distance between two physically separate units or devices are known in the prior art. In particular, document US 2011/0078549 A1 presents a reader for determining the validity of a connection to a transponder, which reader is designed to measure a response time of the transponder and to authenticate the transponder in two separate steps. The document also discloses a transponder that is designed to determine the validity of a connection to a reader, wherein the transponder is designed to provide information to the reader for response time measurement and for authentication in two separate steps, wherein at least some of the data for the authentication is transferred in a communication message between the reader and the transponder during the measurement of the response time.

Different systems for geolocalisation of moving objects or for providing geolocalisation data are also known in the prior art. However, the systems used currently have the disadvantage that, for example, GPS information originates from sensors that are not under the control of the chip card. The geolocalisation data therefore is not reliable because it may originate from another GPS sensor that is further distanced, or may have been falsified by a third party ("man in the middle attack"). The currently used geolocalisation systems therefore are not protected against falsifications of the transmitted position data, nor are they protected from the possibility that a signal of a "fraudulent" sensor, which transmits false position information, may superimpose the signal of the actual sensor provided for use.

Lastly, applications for the use of geolocalisation data for the purpose of planning and carrying out journeys are known from the prior art. In particular, document US 2010/0280748 A1 discloses a route planning for a user comprising steps for determining a start point and a target point for multimodal journeys, applying criteria for limiting the number of candidate routes on the basis of the starting and target point, proposing an updated list of the candidate routes between the starting point and the target point, wherein the updated list is indicated either automatically after a delay and/or upon a user selection on the basis of the criteria. In one embodiment of the method, data for the geolocalisation of the user are processed therein.

BRIEF DESCRIPTION OF THE DRAWINGS

Embodiments of the disclosure will be explained in greater detail hereinafter with reference to the drawings, in which.

DESCRIPTION

Figure 1:
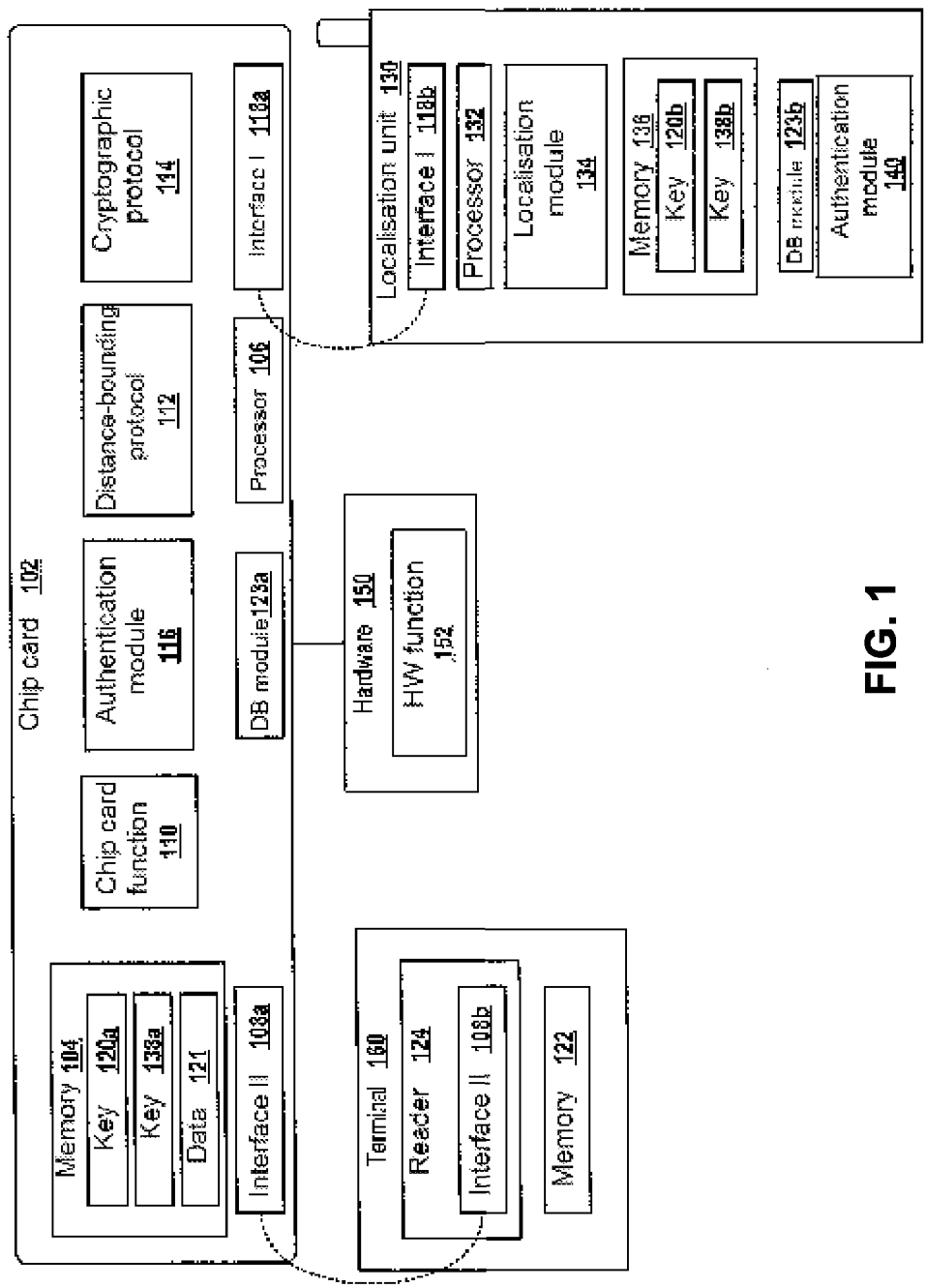
FIG. 1 shows a block diagram of a chip card, a localisation unit and a terminal.

On this basis the object is to provide position data derived by a chip card from an external source with the same position of trust as provided to the data stored in the chip card.

This object is achieved by the features of each of the independent claims. Preferred embodiments and developments are specified in each of the dependent claims.

Unless otherwise expressly mentioned, embodiments of the disclosure can be combined with one another freely.

A "chip" or "microchip" is understood in the present case to mean an integrated circuit that may contain a plurality of electronic components or circuit elements, such as transistors, resistors, etc. Depending on the embodiment, a chip may be part of computers, mobile communication devices, in particular smartphones, digital cameras or other, preferably portable, devices. In accordance with some embodiments the chip is part of a document, in particular part of a security document.

In the present case, any data carrier that has a microchip and an electrically contacting or contactless communication interface connected thereto is referred to as a "chip card" or "document". A contactless interface can be formed in particular as an antenna for wireless signal transfer. The chip card may preferably exchange data with a suitable reader. The chip card may be a value or security document, such as an ID document. An ID document for example may be an identification document, in particular an identity card, a passport, a drivers license, a vehicle registration document, a vehicle license or a company identification document. The value document may be a payment means, in particular a banknote or a credit card. The document may also be another proof of authorisation, for example an entry card, a ticket, in particular an electronic ticket, a consignment note or a visa. The document body of the document may be book-like, as is the case for example with some passports.

A chip card is also understood to mean what is known as a radio label, which is also referred to as an RFID tag or RFID label. The chip card preferably contains an interface for contactless data exchange with the reader. Depending on the embodiment, the chip card may be plastic-based and/or paper-based, for example.

In the present case a "reader" is understood to mean a data processing device that can exchange data with the chip card in order to authenticate the chip card or to allow the chip card to authenticate itself to the reader. In accordance with embodiments the reader may have a cryptographic function for signing and/or authentication to the chip card, a payment function, or another function for carrying out a finance transaction, or an identity function, in particular with image reproduction on a display device. In particular, the reader can implement functions as are known for readers of machine-readable travel documents (MRTDs), in particular cryptographic protocols, such as basic access control (BAC) and/or extended access control (EAC). In accordance with some embodiments the reader may be configured to read data from the document.

In some application scenarios it is necessary to ensure that exclusively an authorised reader can access the data stored in the chip card, such that the reader must authenticate itself to the chip card before this data is read out. The authentication preferably includes the confirmation that the owner of the chip card has willingly made the chip card available to the reader in order to read out the data. This can be implemented for example in that the reader transmits data visible on the surface of the chip card and optically detected by the reader to the chip card as proof that the user has willingly shown the chip card (and the optically detectable data located thereon) to the reader. Alternatively, a secret input by the user into the reader can also be used to authenticate the reader to the chip card.

In the present case "position data" is to be understood to mean any data that enables a locating, i.e. localisation, of a certain object and in particular of the sensor that has detected the position data with respect to a defined fixed point or a reference system defined in another way. In particular, the position data may be data that has been obtained by means of radio and satellite arrangement, i.e. in particular GPS (global positioning system) data, or data that has been obtained by means of geodetic measurement methods (lateration, angulation, polar methods) or other methods (optical land identification, echolocation). The position data by way of example may be specified as planar coordinates, cubic coordinates, polar coordinates or geographic, natural coordinates or in an application-specific format, for example as a location or network identifier. The position data may therefore constitute identifiers of networks or other objects or signal transmitters, which individually or in combination enable a position determination of the sensor.

A "localisation unit" will be understood hereinafter to mean a device or a device component that is capable of automatically sensing its own position. This own position is specified in the form of position data and can be detected by and sent to the localisation unit, for example automatically at regular intervals and/or after obtaining a request from another device, for example from a chip card.

A chip card that is "spatially separate" from a localisation unit is understood in the present case to mean a chip card that the localisation unit does not contain as one of its components. The spatial separation can be, for example, at least 10 cm, and in accordance with further embodiments more than 100 cm.

The transmission of data with the use of a cryptographic protocol will be understood hereinafter to mean a transfer of data in encrypted form, for example by means of asymmetric or symmetric key.

The term "distance-bounding protocols" in the present case designates cryptographic protocols that deliver an actual indication, that is sufficiently difficult to falsify, for the fact that the spatial distance between two physical units does not exceed a predefined maximum distance. Conventional distance-bounding protocols are based on the fact that one of the physical units sends a challenge to the other and, on the basis of the period of time until a response is received, can calculate how far the responding physical unit may be spatially distanced at most along the selected transfer path. This calculation includes known variables, such as the speed of the data transfer with the data transfer technology used in the respective case (speed of light in the case of radio, speed of sound in the case of ultrasound) and preferably also the processing time for the generation and for the sending of the response. On the basis of the duration between the sending of the challenge to the receipt of the response, an estimation for the spatial distance between the physical units can be determined, and therefore also whether or not this exceeds a predefined maximum distance. A distance-bounding protocol may be, for example, a challenge-response method. Examples of distance-bounding protocols are detailed for example in Gerhard Hancke, Markus Kuhn: "*An RFID distance-bounding protocol*", Proceedings SecureComm 2005, and in Stefan Brands, David Chaum: "*Distance-bounding protocols (extended abstract)*", Proceedings Eurocrypt '93.

An "authentication" of a localisation unit to a chip card consists of the furnishing of proof (verifiable data) of an alleged property of the localisation unit to the chip card ("authentication") in combination with the checking of this proof and acceptance of the authenticity of the alleged property by the chip card (authentication in the narrower sense). Whereas an authentication therefore concerns steps that are to be carried out by the localisation unit, the term "authentication in the narrower sense" relates to steps that are to be carried out by the chip card. "Authentication" relates to the entire process in general.

In one aspect the disclosure relates to a method for providing position data to a chip card. The method comprises a portion for receiving or for detecting position data of a localisation unit by the localisation unit, wherein the localisation unit is spatially separate from the chip card. The localisation unit for example may be a GPS sensor or for example a device that is integrated in a vehicle, for example bus or train, and receives an identifier of a current stopping place from, for example, a central traffic planning location, the vehicle driver or another authority. The method also comprises a portion for transmitting the position data from the localisation unit to the chip card via a contactless interface with use of a cryptographic protocol. The method also comprises a portion for carrying out a distance-bounding protocol between the chip card and the localisation unit, wherein the distance-bounding protocol then concludes successfully precisely when the spatial distance between the chip card and the localisation unit does not exceed a predefined maximum distance. Lastly, the method, with successful conclusion of the distance-bounding protocol, provides the execution of a chip card function, wherein the chip card function uses the transmitted position data as position data specifying the current position of the chip card.

The method may be advantageous since the transferred position data can be transferred in a particularly secure manner. Due to the use of a cryptographic protocol, the readout or a targeted manipulation of the transferred data is prevented. The distance-bounding protocol thus ensures that the received position data also actually originates from a localisation unit of which the distance from the chip card is less than or equal to the maximum distance. It is therefore not possible for an "interfering transmitter", which is arranged at a further distance and compensates for this for example with a higher signal strength, to manipulate the function of the chip card by transmitting false position data. The use of a distance-bounding protocol to ensure the spatial vicinity and therefore the trustworthiness of the localisation unit is also advantageous, since the localisation unit can be used by a plurality of chip cards of different manufacturers, different functions, and different chip card-based service providers. For example for payment chip cards and toll system chip cards, it is not necessary for a dedicated localisation unit adapted especially to the respective chip card to be established in each case. The only precondition is that the chip card and the localisation unit can carry out a distance-bounding protocol interactively and can exchange position data.

In accordance with embodiments the maximum distance checked with the distance-bounding protocol is configured by a user, a chip card program or the issuer of the chip card at the time of production of the chip card, at the time of user-specific initialisation of the chip card, or at another subsequent moment in time. Depending on the application scenario and signal strength of the localisation unit, the maximum distance maybe one or more centimeters, but also one to several meters.

In accordance with embodiments the chip card is a SIM card or a chip card of a security document. The localisation unit can detect the position data by way of example by means of GPS, LPS, WLAN, ultrasound, or radio or Bluetooth technology. The distance-bounding protocol can be based for example on ultrasound or electromagnetic radiation, in particular microwaves, radio waves, visible light or infrared light.

By way of example, a chip card that is used as payment means for the use of public transport could contain a configuration file having a checked maximum distance that is sufficiently small to be able to resolve different stopping places. The checked maximum distance may therefore be several meters, possibly also several hundreds of meters. If, however, the chip card is to be used in combination with the localisation unit, for example in order to authenticate itself at a point of sale and unlock its account for payment, a higher resolution is necessary in order to rule out confusion with other individuals in the queue.

Depending on embodiments the maximum distance is predefined by the distance-bounding protocol. In accordance with some embodiments the maximum distance is stored in the chip card in a configuration and can be edited by the user and/or different applications of the chip card, or can be set to another value. This may be advantageous because the chip card can be used for a plurality of application scenarios by means of reconfiguration.

In accordance with embodiments the method also comprises an authentication of the localisation unit to the chip card. Here, a successful authentication is necessary for the execution of the chip card function. The authentication can be performed for example by means of a cryptographic protocol, such as PACE. The authentication can also be performed implicitly by the carrying out of the distance-bounding protocol and the determination that the localisation unit is located at the same distance or less far from the chip card than the maximum distance. A "successful" carrying out of the distance-bounding protocol thus results in an authentication of the localisation unit to the chip card. This may accelerate the method since the successful carrying out of the distance-bounding protocol is already used for authentication and no further data exchange steps between the chip card and localisation unit are necessary.

In accordance with embodiments the distance-bounding protocol is based on a challenge-response protocol.

In accordance with embodiments both the chip card and the localisation unit have a protected memory, in which one or more cryptographic keys is/are stored. The protected memory protects the keys against unauthorised readout. The keys may be symmetric or asymmetric keys, in particular private keys of an asymmetric key pair. Said keys are used to transfer the position data on the basis of the cryptographic protocol, i.e. in encrypted form. The keys necessary for carrying out the distance-bounding protocol can also be stored in the protected memories. The security level of the memory of the chip card preferably corresponds to the security level of the memory of the localisation unit In accordance with embodiments the execution of the distance-bounding protocol provides the use of the least one first and one second cryptographic key. The first cryptographic key is stored securely in a first protected memory medium of the chip card. The second cryptographic key is stored on a second protected memory medium of the localisation unit.

In accordance with embodiments the position data comprises a plurality of location identifiers, which in their totality identify a location at which the localisation unit is located. Alternatively, the position data comprises a location identifier that identifies a location at which the localisation unit is located. A location of this type may be, by way of example, a geographic area, such as a town, a municipality, a building, a room within a building, or also an area of a room.

In accordance with embodiments each location identifier of the plurality of location identifiers constitutes a network identifier. Each network identifier identifies a data communication network, in the transmission region of which the localisation unit is located, which detects this position data. By way of example, the data communication network may be WLAN networks of private households and/or public institutions. Alternatively, the data communication network may also be the transmission regions of different radio transmitters, of which the network identifiers can detect the localisation unit. By way of example, the radio data system (RDS) allows the transmission of additional information via the radio network. This additional information may contain in particular the programme service name (PS), which specifies the transmitter name in the form of up to 8 alphanumeric characters. The individually assigned WLAN network name or the PS transmitter name can be used here in each case as a network identifier.

In combination with a geographic map, in which the areas of the individual networks inclusive of the regions of overlap thereof are contained, it is thus possible, on the basis of one or more network identifiers, to identify a specific geographic location or a geographic area and to detect the location identifier thereof. Here, the map can be stored on the localisation unit or the chip card or on a remote computer, to which the chip card or localisation unit has access. Alternatively to the map, an assignment table can also be used, which assigns a certain location identifier to each combination of network identifiers. Here, a location identifier is an identifier of a certain location or area.

In accordance with embodiments the method also comprises a detection of a location identifier on the basis of the plurality of location identifiers. The detection can be performed by the chip card with the aid of a map or an assignment table. Alternatively, the detection can also be performed by the localisation unit, wherein the localisation unit at least has read access to the geographic map or the assignment table, which are stored in a memory coupled operatively to the localisation unit. The expression "coupled operatively to a localisation unit" designates a storage medium that is an integral part of the localisation unit or that is connected via a network to the localisation unit. Here, the localisation unit at least has read access to the data of the storage medium.

By way of example, the location identifier can be detected from a plurality of network identifiers as follows: the localisation unit is located in an area within which radio signals of the transmitters S1, S4 and S5 can be received with a signal strength above a predefined threshold value. Signals of other radio transmitters, such as S3 or S455, however, are not received in this area or are not received with sufficient strength. The localisation unit may have stored a geographic map or an assignment table, which assigns a location identifier ("area no. 388") to a determined combination of network identifiers {S1, S4 and S5} in a precise manner. This location identifier is detected with the aid of the map or the assignment table by the localisation unit and is transmitted to the chip card as the position data. Alternatively, the geographic map or the assignment table may also be located on a storage medium, which is operatively coupled to a remote server. In this case the localisation unit sends an enquiry to the server, said enquiry containing the three network identifiers S1, S4 and S5. The enquiry can be transmitted via a network, for example the Internet. The server detects therefrom, with use of the map or the assignment table, the location identifier and sends this back to the localisation unit. The localisation unit then transmits the location identifier to the chip card as the position data. Alternatively, the localisation unit may also send the detected network identifiers as the position data to the chip card, provided the chip card is able to identify these in order to detect a location identifier (alone or in interoperation with a remote server).

Alternatively a location identifier is detected with use of a robust mapping algorithm. A robust mapping algorithm is, for example, a robust hash algorithm based on "continuous/fuzzy" location information. GPS data is, for example, position data having a certain, limited accuracy. The same localisation unit, with determination of its position twice, can therefore deliver two different GPS position data items, which deviate slightly from one another.

By use of a robust imaging algorithm, for example also in the form of an allocation of the location identifiers not to a certain GPS data value, but to a range of GPS data, it is possible to derive a unique position identifier.

In accordance with embodiments the implementation of the chip card function contains one or more of the following steps:
  releasing the protected storage medium of the chip card in order to enable the readout of protected data by the localisation unit or by another data-processing system; here, this may be, for example, personal data of the user for whom the map has been personalised, i.e. address data, age information, bank accounts or the like; and/or
  recording the position data for the purpose of recording a movement path of the chip card; these protocols or movement paths can be used for different fields of use, such as toll systems, for the recording of hiking routes or journey routes, etc.; and/or
  carrying out an electronic transaction, in particular a banking transaction; this may include, for example, a payment of goods at a point of sale, entry at an event, etc.; and/or
  electronic ticket purchasing or automatic levying of a toll on the basis of the position data; and/or
  releasing a blocked functionality of a hardware operationally connected to the chip card. The hardware function in particular may be:
    a releasing mechanism of a firearm; this may be advantageous since a weapon can then be used for example only in the direct vicinity of one or more shooting ranges equipped with a special localisation unit; the possibilities of misuse in particular of privately used handguns can thus be significantly reduced;
    the trigger mechanism of an explosion device;
    a mechanism for mixing fluids and/or substances; this may ensure for example that dangerous substances, for example susceptible to explosion, can be processed or mixed with one another only within an especially secured region in the surrounding environment of a corresponding localisation unit;
    a mechanical movement of the hardware or one of the components thereof, in particular the closing or opening of an electronic circuit or the closing or opening of a closure device (door, closure of a container, entry barrier to a geographic area, closure device of a component or of a device component, etc.) or the emission of a warning or confirmation signal.

The combination of a cryptographic protocol for transmitting the position data using the distance-bounding protocol may be particularly advantageous, since on the one hand the cryptographic protocol protects the position data against manipulation and the localisation unit can be authenticated implicitly to the chip card by the distance-bounding protocol. By way of example, a localisation unit can therefore authenticate itself as a spatially closely placed localisation unit of a special type, for example of the special "shooting range localisation unit" type.

In a further aspect the disclosure relates to a chip card. The chip card includes:
  a memory medium for the protected storage of at least one cryptographic key;
  a contactless interface for receiving position data from a localisation unit. The data is received with use of a cryptographic protocol with use of the at least one cryptographic key;
  a distance-bounding (DB) module, which is configured to execute a distance-bounding protocol between the chip card and the localisation unit. The distance-bounding protocol contains the confirmation by a checked entity that this is located within a spatial maximum distance from a checker. The chip card preferably acts as the checker and the localisation unit as the checked entity.
  a chip card function, which can be executed only in the event of a successful confirmation that the localisation unit is located within the spatial maximum distance from the chip card. The chip card function uses the transmitted position data as position data specifying the current position of the chip card.

In accordance with embodiments the chip card also comprises an authentication module, which is configured to authenticate the localisation unit. Only in the event of a successful authentication of the localisation unit are the transmitted position data used by the chip card function as position data indicating the current position of the chip card. In some embodiments the distance-bounding module of the chip card acts at the same time also as an authentication module when the authentication is based on the successful implementation of the distance-bounding protocol.

In a further aspect the disclosure relates to a system having a localisation unit. The localisation unit comprises:
  a localisation module that is configured to receive or detect position data of the localisation unit;
  a storage medium for the protected storage of at least one cryptographic key;
  an interface for the contactless transmission of the position data to a chip card, wherein the data is transmitted with use of a cryptographic protocol with use of the at least one cryptographic key;
  a distance-bounding (DB) module, which is configured to execute a distance-bounding protocol between the localisation unit and the chip card. The distance-bounding protocol then concludes successfully precisely when the spatial distance between the localisation unit and the chip card does not exceed a predefined maximum distance.

In accordance with embodiments the localisation unit also comprises an authentication module that is configured to authenticate the localisation unit to the chip card. The authentication module in some embodiments can also be embodied in the distance-bounding module of the localisation unit when the authentication of the localisation unit to the chip card is based on the successful implementation of the distance-bounding protocol, i.e. on the confirmation that the localisation unit is located within the spatial maximum distance from the chip card.

In accordance with embodiments the system comprises the chip card configured in accordance with one of the above-mentioned embodiments or a combination of the features of any embodiments.

Elements of the following embodiments that correspond to one another will be designated by the same reference signs.

FIG. 1 shows a chip card 102 having a protected memory medium 104. The memory contains one or more keys 120a for implementing the distance-bounding protocol. The memory may contain a further key 138a for the protected transfer of position data from the localisation unit to the chip card. In addition the protected memory may contain data 121, for example personal data of a user to whom the chip card is assigned. The data for example may consist of account information of the user, signature keys or the like. The chip card is able to execute a distance-bounding protocol via a module 123a in interaction with a corresponding module 123b of the localisation unit 130. In addition the chip card has a processor 106 able to implement a chip card function 110 with use of position data, preferably following an authentication of the localisation unit at the chip card. The position data is detected by the localisation unit 130 by means of the localisation module 134 thereof, for example a GPS sensor, and is transferred from the localisation unit to the chip card via a preferably contactless interface 118. Here, the position data is transferred preferably on the basis of a cryptographic protocol 114 in order to ensure that the transferred position data can be neither read nor manipulated. For this purpose, symmetric keys 138a, 138b can be used for example, which are each stored on a protected memory medium 104, 136 of the chip card or the localisation unit. The distance-bounding protocol to be used inclusive of a predefined maximum distance is stored on the chip card. The chip card may have corresponding interfaces, which allow the user of the chip card or an administrator to modify the maximum distance that is checked when implementing the distance-bounding protocol.

The chip card preferably also has an interface 108 in order to exchange data with a reader 124 of a terminal 160. The interface 108 may be a contactless or a contact-based interface, which preferably support suitable protocols (for example PACE in the case of a contactless interface) for authentication of the reader and/or for secure data transfer.

The chip card may be operatively connected to a hardware 150, which provides a certain hardware function 152. For example, the hardware 150 may be a handgun containing the chip card. The hardware function may be the release of the shooting function of the weapon. In this case the chip card function 110 may consist of checking whether a localisation unit 130 of a shooting range has successfully authenticated itself to the authentication module 116 of the chip card and whether, in addition, position data has been received by the localisation unit, said position data originating reliably from a closely placed localisation unit within the predefined maximum distance via the distance-bounding protocol, such that it is ensured that the authentication has also actually been implemented by a localisation unit within the protected region of a shooting range and/or the chip card and the handgun are therefore also located within this protected region. In this case the execution of the chip card function 110 includes the sending of a signal to the hardware 150 in order to release the shooting function. When the coordinates of a plurality of shooting ranges are stored in the chip card or a server having this interoperable service or providing this service, the handgun can be used accordingly at a plurality of shooting ranges, but not outside a protected region of this type The terminal 160 may be a data processing system, which itself or in conjunction with a remote service or server is interoperable with the chip card. By way of example, the terminal may be a point-of-sale terminal that has a reader 124, which is designed to read optical data from the chip card via an optical interface (for example from the MRZ or machine readable zone) in order to authenticate itself to the chip card and 2 read out data 121 from the memory medium 104 via a further interface 108. This data may be account information and may be used by the terminal or remote service in order to debit a fee automatically from the account of the user, for example for the entrance to the shooting range or for the use of the weapon.

A plurality of other hardware types and corresponding hardware functions 152 are used in other embodiments, in particular those which pose a risk to the user or third parties and that are therefore to be released only at locations where it can be reliably assumed that the hardware function harms neither the user nor third parties.

Figure 2:
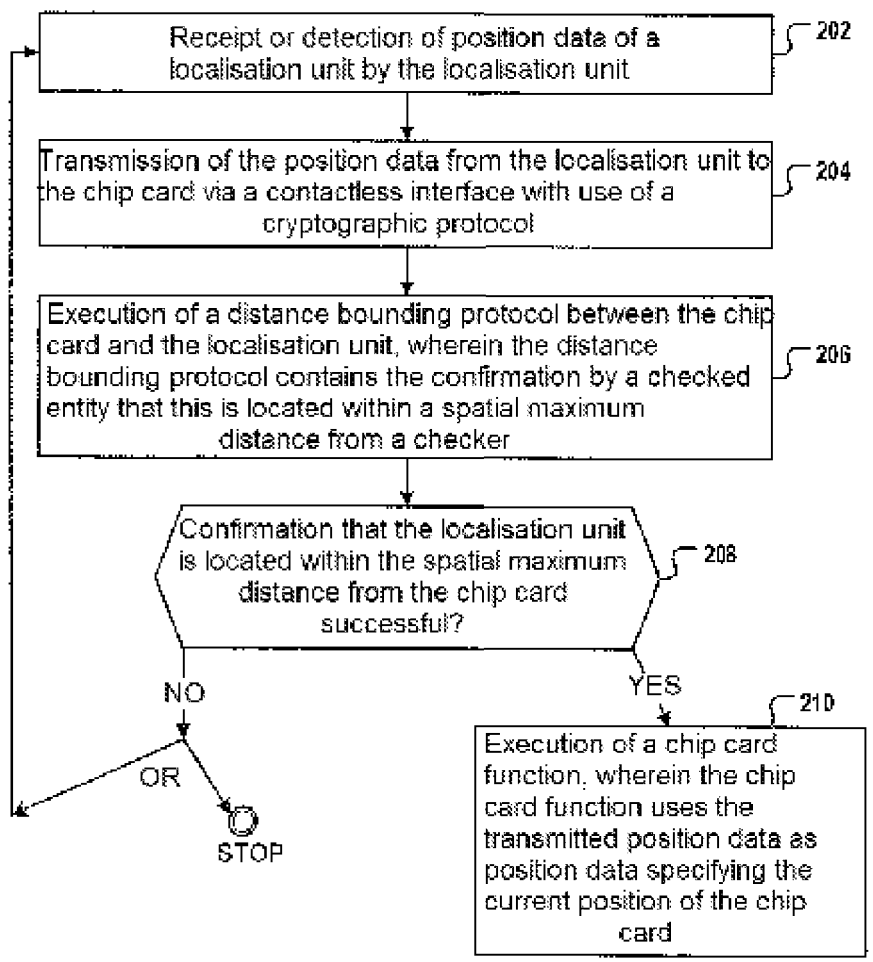
FIG. 2 shows a flow diagram of an embodiment of a method according to the disclosure.

FIG. 2 shows a flow diagram of the method in accordance with an embodiment of the disclosure. In step 202 a localisation unit 130 detects or receives position data specifying the position of the localisation unit. For example, the localisation unit may contain a localisation module 134 in the form of a GPS sensor. The position data is transmitted in encrypted form in step 204 from the localisation unit to the chip card via a contactless interface. This serves in particular for the trustworthiness of the position data and the protection of the data against manipulations. In step 206 a distance-bounding protocol is carried out between the chip card and the localisation unit. In step 208 the chip card checks whether the localisation unit was successfully able to provide the confirmation that the localisation unit is located within the spatial maximum distance from the chip card. If the confirmation is provided, the chip card in step 210 performs a chip card function 110, wherein the chip card function uses the transmitted position data. If the confirmation was not possible, the method can be aborted at this point or may contain one or more further program loops comprising the steps 202-208. By way of example, the chip card may have a service that checks at regular intervals whether position data has been transmitted from a localisation unit to the chip card. The localisation unit may have a service that at regular intervals identifies its own position and/or at regular intervals checks whether an enquiry or challenge for implementing a distance-bounding protocol has been received by a chip card. If the method provides an authentication of the localisation unit to the chip card, step 206 can be performed prior to or following the authentication or itself may constitute the authentication in combination with step 208, wherein the authentication is successful when the chip card determines that the localisation unit lies within the maximum distance of the distance-bounding protocol.

Figures 3, 4:
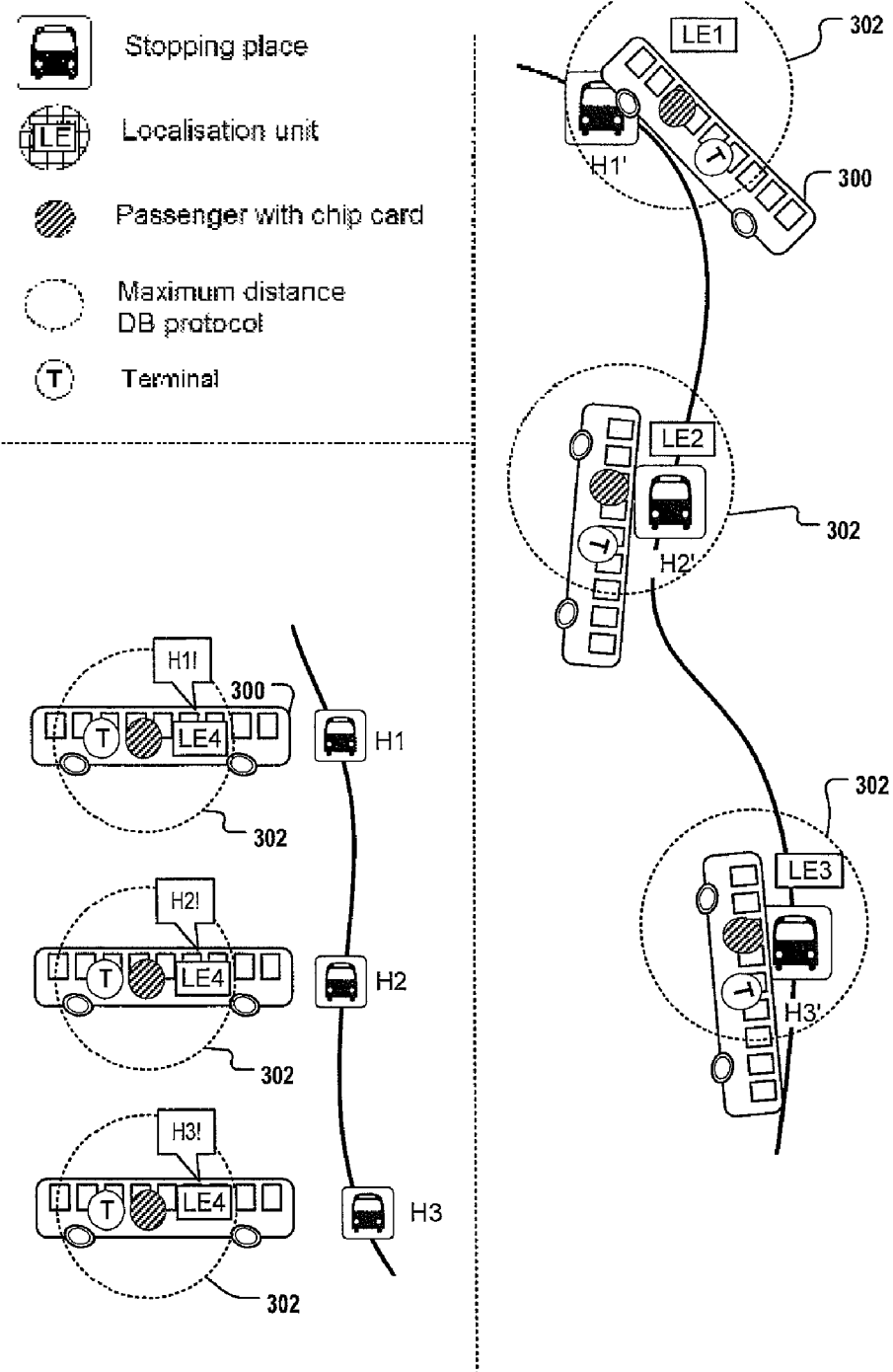
FIG. 3 shows an application scenario for a chip card and localisation unit according to the disclosure in a journey detection system.
FIG. 4 shows an alternative application scenario for a chip card and localization unit according to the disclosure in a journey detection system.

FIG. 3 shows an application scenario of embodiments of the disclosure in the context of an automatic journey detection for public transport. A vehicle 300, for example a bus or a train, is equipped with an integrated localisation unit LE4 and a terminal T. The terminal T for example may be a terminal which is connected by satellite network to a server of a bank service provider. The terminal has a reader 124 and suitable interfaces 108 in order to read data, necessary for carrying out the payment process, from the memory medium 104 of a chip card 102 belonging to a passenger. The terminal is preferably located at the doors of the vehicle, or the terminal is located at each door of the vehicle. Each time a passenger with chip card boards, there is an automatic authentication of the terminal to the chip card and vice versa, wherein the terminal determines the identity of the passenger and also records the stopping place at which the passenger has boarded. When the passenger leaves the vehicle at another stopping place, a terminal at the corresponding vehicle door also determines the identity of the passenger and records the stopping place at which the passenger has left the vehicle. This information can be used for the automatic creation of a bill for the use of the vehicle. Here, the terminal does not itself determine the current stopping places at which a passenger boards and disembarks, but rather the corresponding position data or identifiers of the stopping places are determined in an up-to-date manner, in each case by the localisation unit LE4, and is/are transferred to the chip card as described above. The chip card performs a chip card function, which includes transmitting the current position data (in other words here the stopping places of the boarding and departure) from the chip card to the terminal when the vehicle is entered and left (via a door in the vicinity of which a terminal is located). This transmission is preferably contactless in order to make the disembarking and boarding of passengers as efficient as possible.

The chip card is thus assigned to a passenger to whom the chip card belongs. The localisation unit LE4 is an integral part of the vehicle and is able to determine its own position dynamically during the journey, wherein the accuracy of the determined position is at least sufficient to resolve individual stopping places at which passengers board and disembark. The localisation unit LE4 can be embodied as a GPS sensor, but may also be a semi-automatic localisation unit, at which the driver, each time the vehicle is stopped at a stopping place, sets the position currently identified by the LE4 and, where appropriate, communicated to the chip card, to the current stopping place H1, H2 or H3. Alternatively, a signal transmitter, for example a radio transmitter, may be mounted at each stopping place and sends a signal to the localisation unit LE4 within the vehicle in order to enable this to determine its current position within, for example, a network line plan and to keep up to date.

The passenger to whom the chip card 102 is assigned may enter the vehicle 300 for example at stopping place H1. The user can authenticate themself to the chip card during, before or directly after the boarding of the vehicle, for example by inputting a PIN or a password or by means of biometric data. In addition, the user may release a corresponding payment function of its chip card, which in some cases may require an additional authentication to a certain application logic. By way of example, the operator of a rail network or local transport network within a town could provide a corresponding application logic for automatic journey detection and payment, which the passenger must install on their mobile communication device and authenticate themself to. The operator of the rail or traffic network could also provide its customers with a personalised chip card, on which all necessary account information of the customer is contained in order to enable an automatic billing and/or debiting.

Hereinafter a "password" will be understood to mean a sequence of alphanumeric characters and/or special characters. A PIN preferably consists of a few (for example four) positions and of alphanumeric characters. However, depending on safety requirements, PINs with further positions and consisting of numbers or a mixture of alphanumeric and special characters are also possible. In accordance with some embodiments of the disclosure the password is stored in the document. The password for authentication of the user to the chip card may additionally also be installed on the chip card in an optically detectable manner (for example printing, embossing, etc.) in the form of a machine-readable zone (MRZ). In addition to the storage, the password may additionally be printed on the chip card in an optically detectable manner, even in the form of a card access number (CAN), i.e. a number printed on the chip card, and may enable a reader to authenticate to the chip card by means of the CAN.

In addition the chip card executes a distance-bounding protocol with the localisation unit LE4 when the passenger enters the vehicle, or immediately hereafter, and receives position data from the localisation unit, which position data may consist for example of an identifier of the current stopping place H1. Whilst the vehicle 300 moves form the stopping place H1 via H2 after stopping place H3, the localisation unit LE4 continuously transmits its current position data at certain time intervals and additionally executes the distance-bounding protocol with the chip card at regular time intervals, such that the chip card "can ensure" that the position data originates from a trustworthy, spatially closely placed localisation unit. In addition the current position of the localisation unit is updated with each change of the stopping places.

The identifiers of the respective current stopping place are thus transmitted continuously from the localisation unit to the chip card of the passenger during the entire journey or at least upon boarding and disembarking, wherein, at least when boarding and disembarking, the start stopping place and the target stopping place are transmitted from the chip card to the terminal with execution of the chip card function 110. The terminal may record or store in a central server the stopping places at which the passenger boards and disembarks. The terminal may also create a bill for the journey actually covered by the passenger for an individual case or for example on a monthly or annual basis and may debit this, possibly also fully automatically, from the account of the passenger. When recording and/or creating a bill or debiting, the terminal preferably works together with further computers, for example database and application servers, which provide corresponding memories or recording or payment services, wherein the servers are typically located in remote computer centres.

FIG. 4 shows an alternative embodiment of the above-described application scenario. The application scenario of FIG. 4 differs from that illustrated in FIG. 3 substantially in that each stopping place is fixedly assigned its own localisation unit LE1-LE3. By contrast with that described in FIG. 3, it is therefore not necessary for the vehicle 300 itself to have a corresponding localisation unit, of which the position data is continuously updated during the journey. Rather, each localisation unit of FIG. 4 is fixedly assigned its respective position information. By way of example, the localisation unit LE1 can thus always transmit the location identifier H1' as the position data to the chip card, whereas localisation unit LE2 always transmits the location identifier H2' and the localisation unit L3 always transmits the location identifier H3'. The maximum distance 302 preconfigured in the chip card for the distance-bounding protocol is typically slightly greater for the application scenario according to FIG. 4 than according to FIG. 3, since the localisation unit according to FIG. 4 is located outside the vehicle 300.

Some aspects and features of the disclosed embodiments are set out in the following numbered items:

1. A method for providing position data for a chip card (102) having portions for: receiving (202) or detecting position data of a localisation unit (130) by the localisation unit (130), wherein the localisation unit (130) is spatially separate from the chip card (102); transmitting (204) the position data from the localisation unit (130) to the chip card (102) via a contactless interface (118) with use of a cryptographic protocol (114); executing (206) a distance-bounding protocol (112) between the chip card (102) and the localisation unit (130), wherein the distance-bounding protocol (112) then concludes successfully precisely when the spatial distance between the chip card (102) and localisation unit (130) does not exceed a predefined maximum distance; executing (210) a chip card function (110) with successful conclusion of the distance-bounding protocol (112), wherein the chip card function (110) uses the transmitted position data as position data specifying the current position of the chip card (102).

2. The method according to item 1, further comprising the authentication of the localisation unit (130) to the chip card (102) by confirmation during the course of the execution of the distance-bounding protocol (112) that the localisation unit (130) is located within the spatial maximum distance.

3. The method according to one of the preceding items, wherein the maximum distance is predefined by the distance-bounding protocol (112).

4. The method according to one of the preceding items, wherein the distance-bounding protocol (112) is based on a challenge-response protocol.

5. The method according to one of the preceding items, wherein the execution of the distance-bounding protocol provides the use of at least one first (120a) and one second (120b) cryptographic key, wherein the at least first cryptographic key is securely stored in a first protected memory medium (104) of the chip card, wherein the at least second cryptographic key is stored on a second protected memory medium (136) of the localisation unit.

6. The method according to one of the preceding items, wherein the position data comprises: a plurality of location identifiers, which in their totality identify a location at which the chip card (102) and/or the localisation unit (130) is/are located; or a location identifier, which identifies a location at which the chip card (102) and/or the localisation unit (130) is/are located.

7. The method according to item 6, wherein each location identifier of the plurality of location identifiers constitutes a network identifier, wherein each network identifier identifies a data communication network, in the transmission region of which the chip card (102) and/or the localisation unit (130) is/are allocated, which detects/detect this position data.

8. The method according to one of the preceding items, wherein the implementation of the chip card function (110) comprises portions for: releasing the protected memory medium (104) of the chip card (102) to enable the readout of protected data (121) by the localisation unit (130) or by another data-processing system (160); and/or recording the position data for the purpose of recording a movement path of the chip card (102); and/or carrying out an electronic transaction, in particular a bank transaction; and/or carrying out an electronic ticket purchase or an automatic levying of a toll on the basis of the position data; and/or releasing a blocked hardware function (152) of a hardware (150), which is operationally connected to the chip card (102).

9. The method according to item 8, wherein the blocked hardware function (152) intended for release is implemented in: an unlocking mechanism of a firearm; a trigger mechanism of an explosion device; a mechanism for mixing liquids and/or substances; or another sort of movement of the hardware or one of its components.

10. A chip card (102), comprising: a memory medium (104) for the protected storage of at least one cryptographic key (138a); a contactless interface (118) for receiving position data from a localisation unit (130), wherein the use of a cryptographic protocol (114) is received with use of the at least one cryptographic key; a distance-bounding (DB) module (123a), which is designed to execute a distance-bounding protocol (112) to a localisation unit (130), wherein the distance-bounding protocol is then concluded successfully precisely when the spatial distance from the localisation unit (130) does not exceed a predefined maximum distance; and a chip card function (110), which can be executed only in the event of a successful conclusion of the distance-bounding protocol, wherein the chip card function (110) uses the transmitted position data as position data specifying the current position of the chip card (102).

11. The chip card (102) according to item 10, further comprising an authentication module (116), which is configured to authenticate the localisation unit (130) by the chip card (102), wherein the transmitted position data indicating the current position of the chip card (102) is used only in the event of a successful authentication of the localisation unit (130).

12. A system containing a localisation unit (130), wherein the localisation unit comprises: a localisation module (134), which is configured to receive or determine position data of the localisation unit; a storage medium (136) for the protected storage of at least one cryptographic key (138b); an interface (118) for the contactless transmission of the position data to a chip card, wherein the data is transmitted with use of a cryptographic protocol (114) with use of the at least one cryptographic key (138b); and a distance-bounding (DB) module (123b), which is configured to execute a distance-bounding protocol between the localisation unit (130) and the chip card (102), wherein the distance-bounding protocol then concludes successfully precisely when the spatial distance between the chip card (102) and the localisation unit (130) does not exceed a predefined maximum distance (302).

13. The system according to item 12, wherein the localisation unit (130) also comprises an authentication module (140), which is configured to authenticate the localisation unit (130) to the chip card (102).

14. The system according to one of items 12 or 13, further comprising the chip card (102), wherein the chip card (102) is configured in accordance with one of items 10 or 11.

15. The system according to one of items 12 to 14, wherein the chip card (102) is a SIM card or a chip card of a security document, and/or wherein the localisation unit (130) identifies the position data by means of GPS, LPS, WLAN, ultrasound, or radio or Bluetooth technology, and/or wherein the distance-bounding protocol is based on ultrasound or electromagnetic radiation, in particular microwaves, radio waves, visible light or infrared light.

What is claimed is:

1. A method for providing position data for a chip card having portions for:
   receiving or detecting position data of a localisation unit by the localisation unit, wherein the localisation unit is spatially separate from the chip card;
   transmitting the position data from the localisation unit to the chip card via a contactless interface with use of a cryptographic protocol;
   executing a distance-bounding protocol between the chip card and the localisation unit, wherein the distance-bounding protocol then concludes successfully precisely when the spatial distance between the chip card and localisation unit does not exceed a predefined maximum distance; and
   executing a chip card function with successful conclusion of the distance-bounding protocol, wherein the chip card function uses the transmitted position data as position data specifying the current position of the chip card.

2. The method according to claim 1, further comprising the authentication of the localisation unit to the chip card by confirmation during the course of the execution of the distance-bounding protocol that the localisation unit is located within the spatial maximum distance.

3. The method according to claim 1, wherein the maximum distance is predefined by the distance-bounding protocol.

4. The method according to claim 1, wherein the distance-bounding protocol is based on a challenge-response protocol.

5. The method according to claim 1, wherein the execution of the distance-bounding protocol provides the use of at least one first and one second cryptographic key, wherein the at least first cryptographic key is securely stored in a first protected memory medium of the chip card, wherein the at least second cryptographic key is stored on a second protected memory medium of the localisation unit.

6. The method according to claim 1, wherein the position data comprises:
   a plurality of location identifiers, which in their totality identify a location at which the chip card and/or the localisation unit is/are located; or
   a location identifier, which identifies a location at which the chip card and/or the localisation unit is/are located.

7. The method according to claim 6, wherein each location identifier of the plurality of location identifiers constitutes a network identifier, wherein each network identifier identifies a data communication network, in the transmission region of which the chip card and/or the localisation unit is/are allocated, which detects/detect this position data.

8. The method according to claim 1, wherein the implementation of the chip card function comprises portions for:
   releasing the protected memory medium of the chip card to enable the readout of protected data by the localisation unit or by another data-processing system; and/or
   recording the position data to record a movement path of the chip card; and/or
   carrying out an electronic transaction; and/or
   carrying out an electronic ticket purchase or an automatic levying of a toll on the basis of the position data; and/or
   releasing a blocked hardware function of a hardware, which is operationally connected to the chip card.

9. The method according to claim 8, wherein the blocked hardware function intended for release is implemented in:
   an unlocking mechanism of a firearm;
   a trigger mechanism of an explosion device;
   a mechanism for mixing liquids and/or substances; or
   another sort of movement of the hardware or one of its components.

10. A chip card, comprising:
    a memory medium for the protected storage of at least one cryptographic key;
    a contactless interface that receives position data from a localisation unit, wherein the use of a cryptographic protocol is received with use of the at least one cryptographic key;
    a distance-bounding module, which is designed to execute a distance-bounding protocol to a localisation unit, wherein the distance-bounding protocol is then concluded successfully precisely when the spatial distance from the localisation unit does not exceed a predefined maximum distance; and
    a chip card function, which can be executed only in the event of a successful conclusion of the distance-bounding protocol, wherein the chip card function uses the transmitted position data as position data specifying the current position of the chip card.

11. The chip card according to claim 10, further comprising an authentication module, which is configured to authenticate the localisation unit by the chip card, wherein the transmitted position data indicating the current position of the chip card is used only in the event of a successful authentication of the localisation unit.

12. A system containing a localisation unit, wherein the localisation unit comprises:
    a localisation module, which is configured to receive or determine position data of the localisation unit;
    a storage medium for the protected storage of at least one cryptographic key;
    an interface for the contactless transmission of the position data to a chip card, wherein the data is transmitted with use of a cryptographic protocol with use of the at least one cryptographic key; and
    a distance-bounding module, which is configured to execute a distance-bounding protocol between the localisation unit and the chip card, wherein the distance-bounding protocol then concludes successfully precisely when the spatial distance between the chip card and the localisation unit does not exceed a predefined maximum distance.

13. The system according to claim 12, wherein the localisation unit also comprises an authentication module, which is configured to authenticate the localisation unit to the chip card.

14. The system according to claim 12, further comprising the chip card, wherein the chip card comprises:
    a memory medium for the protected storage of at least one cryptographic key;
    a contactless interface that receives position data from a localization unit, wherein the use of a cryptographic protocol is received with use of the at least one cryptographic key;
    a distance-bounding module, which is designed to execute a distance-bounding protocol to a localization unit, wherein the distance-bounding protocol is then concluded successfully precisely when the spatial distance from the localization unit does not exceed a predefined maximum distance; and a chip card function, which can be executed only in the event of a successful conclusion of the distance-bounding protocol, wherein the chip card function uses the transmitted position data as position data specifying the current position of the chip card.

15. The system according to claim 12,
wherein the chip card is a SIM card or a chip card of a security document; and/or
wherein the localisation unit identifies the position data by GPS, LPS, WLAN, ultrasound, or radio or Bluetooth technology; and/or
wherein the distance-bounding protocol is based on ultrasound or electromagnetic radiation.

\* \* \* \* \*